(12) United States Patent
Hana et al.

(10) Patent No.: US 8,657,713 B2
(45) Date of Patent: *Feb. 25, 2014

(54) POWER TRAIN FOR WORK VEHICLE

(75) Inventors: Hidetoshi Hana, Sakai (JP); Hiroaki Nakagawa, Sakai (JP)

(73) Assignee: Kubota Corporation, Osaka (JP)

(*) Notice: Subject to any disclaimer, the term of this patent is extended or adjusted under 35 U.S.C. 154(b) by 385 days.

This patent is subject to a terminal disclaimer.

(21) Appl. No.: 13/051,712

(22) Filed: Mar. 18, 2011

(65) Prior Publication Data

US 2012/0046138 A1 Feb. 23, 2012

(30) Foreign Application Priority Data

Aug. 19, 2010 (JP) .................................. 2010-183767

(51) Int. Cl.
*F16H 47/04* (2006.01)
*B60K 25/00* (2006.01)
*B60K 17/28* (2006.01)

(52) U.S. Cl.
USPC .......................................... 475/72; 180/53.4

(58) Field of Classification Search
USPC .......................................... 475/72; 180/53.4
See application file for complete search history.

(56) References Cited

U.S. PATENT DOCUMENTS

| | | | |
|---|---|---|---|
| 3,969,958 A * | 7/1976 | Miyao et al. | 475/82 |
| 3,988,949 A | 11/1976 | Weseloh et al. | |
| 8,308,597 B2 * | 11/2012 | Hiraoka et al. | 475/80 |

| | | | |
|---|---|---|---|
| 2004/0209718 A1 | 10/2004 | Ishibashi et al. | |
| 2006/0172853 A1 | 8/2006 | Ishibashi et al. | |
| 2009/0270212 A1 | 10/2009 | Ueda et al. | |
| 2010/0184551 A1 | 7/2010 | Hiraoka et al. | |

FOREIGN PATENT DOCUMENTS

| | | | |
|---|---|---|---|
| JP | 5126233 A | | 5/1993 |
| JP | 2005215200 | | 8/1993 |
| JP | 200018367 A | | 1/2000 |
| JP | 2002098217 | | 4/2002 |
| JP | 2003130177 A | | 5/2003 |
| JP | 2008014416 | | 1/2008 |
| JP | WO2009/037877 | * | 3/2009 |
| JP | 200974617 A | | 4/2009 |

* cited by examiner

*Primary Examiner* — David D Le
*Assistant Examiner* — Colby M Hansen
(74) *Attorney, Agent, or Firm* — The Webb Law Firm

(57) ABSTRACT

A power train for a tractor includes an engine power transmission shaft extending along the longitudinal direction of the vehicle body rearwardly of an engine, and a hydrostatic stepless speed changer unit (HST) configured to input power from the engine. A pump and a motor of the HST are juxtaposed along the transverse direction of the vehicle body. A planetary gear unit is disposed rearwardly of the HST in the longitudinal direction of the vehicle body. The planetary gear unit is configured to input power from the engine via the engine power transmission shaft and power from the HST and to output a traveling power. A branch transmission mechanism is disposed forwardly of the HST in the longitudinal direction of the vehicle body and configured to transmit the power from the engine to an input shaft of the pump and to the engine power transmission shaft in distribution.

6 Claims, 10 Drawing Sheets

| travel direction | reverse travel direction | forward travel direction | |
|---|---|---|---|
| speed change range | entire vehicle speed range | low speed range (f1) | high speed range (f2) |
| forward/reverse travel switchover mechanism(50) | reverse travel condition | reverse travel condition | forward travel condition |

POWER TRAIN FOR WORK VEHICLE

TECHNICAL FIELD

The present invention relates to a power train for a work vehicle, in particular for a tractor, having a hydrostatic stepless speed changer unit configured to input engine power, and a planetary gear unit configured to input an output from the hydrostatic stepless speed changer unit and to output a traveling drive force.

BACKGROUND ART

An example of the conventional power train of the above-noted type is known e.g. from the Japanese Unexamined Patent Application Publication No. 2003-130177. This power train includes a hydrostatic stepless speed changer mechanism and a planetary gear mechanism and configured such that a pump side input gear is fixedly mounted on a pump output shaft extending through a rotational axis of a hydraulic pump of the hydrostatic stepless speed changer mechanism, and as this pump side input gear meshes a gear formed in a carrier, the engine power is inputted to the planetary gear mechanism. With this type of power train for a tractor, engine power not subject to the speed changing effect by the hydrostatic stepless speed changer mechanism is inputted to a predetermined rotary body that constitutes the planetary gear mechanism. However, a problem as follows would tend to occur.

Namely, the hydrostatic stepless speed changer mechanism is to be assembled in such a manner that the pump and the motor of this hydrostatic stepless speed changer mechanism are juxtaposed to each other along the transverse direction of the vehicle body on the front side of the vehicle body as seen in a plan view of the vehicle body. In this, with the conventional power train of this type, transmission means for inputting the engine power not subject to the speed changing effect by the hydrostatic stepless speed changer mechanism to the planetary gear mechanism is interposed between the hydrostatic stepless speed changer mechanism and the planetary gear mechanism, so there arises a need to assemble the hydrostatic stepless speed changer mechanism and the planetary gear mechanism in a spaced relationship from each other in the fore/aft direction of the vehicle body.

SUMMARY OF THE INVENTION

In view of the above-described state of the art, the object of the present invention is to provide a technique that allows to form compact, in the fore/aft direction of the vehicle body, the power train including an engine, a hydrostatic stepless speed changer mechanism and a planetary gear unit.

For accomplishing the above-noted object, a power train for a tractor, according to the present invention comprises:

an engine;

an engine power transmission shaft extending along the longitudinal direction of the vehicle body rearwardly of the engine;

a hydrostatic stepless speed changer unit (HST) configured to input power from the engine, said HST having a pump and a motor that are juxtaposed along the transverse direction of the vehicle body;

a planetary gear unit disposed rearwardly of said HST in the longitudinal direction of the vehicle body and configured to input power from the engine via said engine power transmission shaft and power from said HST and to output a traveling power; and a branch transmission mechanism disposed forwardly of said HST in the longitudinal direction of the vehicle body and configured to transmit the power from the engine to an input shaft of said pump and to said engine power transmission shaft in distribution.

With this construction, a pump and a motor that constitute a hydrostatic stepless speed changer mechanism are juxtaposed along the transverse direction of the vehicle body as seen in a plan view of the vehicle body. Whereby, the space required for assembling the HST is reduced in the fore/aft direction and vertical direction of the vehicle body. Moreover, in spite of the above arrangement, the engine power transmission shaft for inputting engine power to the planetary gear unit is disposed to extend from the HST more forwardly of the vehicle body than the pump, and the branch transmission mechanism for transmitting the engine power to the input shaft of the pump and to the engine power transmission shaft of the planetary gear unit in distribution is disposed forwardly of the vehicle body, relative to the pump and the motor of the HST. With these arrangements, there is no need to provide, between the HST and the planetary gear mechanism, a power inputting mechanism for inputting engine power not subjected to the speed changing effect by the HST to the planetary gear mechanism and this engine power not subjected to the speed changing effect by the HST to the planetary gear mechanism can be inputted to the planetary gear unit via the branch transmission mechanism. Whereby, the HST and the planetary gear unit are assembled in a more compact manner, closer to each other in the fore/aft direction of the vehicle body than the convention.

Therefore, the space required for assembling the HST can be rendered compact in the fore/aft direction and vertical direction of the vehicle body. In addition, the HST and the planetary gear unit can be assembled in maximally compact manner as closely as possible to each other in the fore/aft direction of the vehicle body. With these as a whole, it is possible to obtain a tractor that can be speed changed in a stepless manner and operated easily, with assembling the HST and the planetary gear unit in a compact manner to the transmission case and with minimized wheel base.

According to one preferred embodiment of the present invention, said branch transmission mechanism comprises a gear unit having an engine side gear operably coupled to an output shaft of the engine and a transmission gear set meshing with the engine side gear, a rotational axis of said transmission gear set being located lower than a disposing height of a rotational axis of said engine side gear;

one transmission gear of said transmission gear set is operably coupled to an input shaft of said pump to be rotatable in unison therewith; and the other transmission gear of said transmission gear set is rotatable in unison with said engine power transmission shaft.

With this construction, the power from the output shaft of the engine is transmitted in distribution via the engine side gear and a pair of transmission gears to the HST and to the planetary gear unit, and the power branched to the HST side is inputted to this HST, whereas the power branched to the planetary gear unit is inputted via the engine power transmission shaft to this planetary gear unit. With these arrangements, the engine power not subject to the speed changing effect by the HST can be fed to the planetary gear unit, without needing to provide a power input mechanism for inputting the engine power not subject to the speed changing effect by the HST to the planetary gear unit.

And, as the rotational axis of the transmission gear set is located lower than a disposing height of a rotational axis of the engine side gear, it is possible to prevent the transmission gear set from projecting upwardly of the vehicle body from the engine. If an access step to the driver's section is to be disposed upwardly of the branch transmission mechanism, the above-described arrangement makes it possible to form this driver's section access step flat or substantially flat. That is, in addition to the above-described possibility of assembling the HST and the planetary gear unit to the transmission case in a compact manner, even when the driver's section access step is located upwardly of the branch transmission mechanism, this driver's section access step can be formed flat or substantially flat, thus providing a user friendly construction in the respect of the driver's getting on/off and driving operation.

According to one preferred embodiment of the present invention, said branch transmission mechanism includes a forward/reverse travel switchover mechanism having an input shaft operably coupled to the engine output shaft, a pump interlocking mechanism for interlocking said input shaft of the forward/reverse travel switchover mechanism with said input shaft of the pump and a planet interlocking mechanism for interlocking an output shaft of said forwaxd/reverse travel switchover mechanism with said engine power transmission shaft.

With the above construction, on one side, the engine power is branched to the HST via the input shaft of the forward/reverse travel switchover mechanism and the gear mechanism, and this branched power is fed to the HST via the input shaft. On the other hand, the engine power is branched to the planetary gear mechanism via the input shaft and the output shaft of the forward/reverse travel switchover mechanism. With these, the engine power not subjected to the speed changing effect of the HST can be fed to the planetary gear unit, without the need to provide, between the HST and the planetary gear mechanism, a power input mechanism for inputting the engine power not subjected to the speed changing effect of the HST to the planetary gear unit. Like the engine power is inputted to the HST only in a predetermined rotational direction, the engine power is inputted to the planetary gear unit only in a predetermined direction. For providing a forward travel drive force at a low speed, the HST controls speed change to a reverse rotation condition. As the planetary gear unit combines the drive force in the reverse rotation direction inputted from the HST with the drive force in the forward rotation direction not subjected to the speed changing effect of the HST, a forward travel drive force at a predetermined low speed can be outputted from the planetary gear unit. That is, a forward travel drive force at a predetermined low speed can be obtained by causing the planetary gear unit to create a speed changing effect under a high transmission efficiency condition.

Accordingly, it is possible to assemble the HST and the planetary gear unit to the transmission case in a compact manner and to create a low-speed forward travel drive force with high transmission efficiency, thereby to reduce the power loss.

DESCRIPTION OF EMBODIMENTS

First Embodiment

Figure 1:
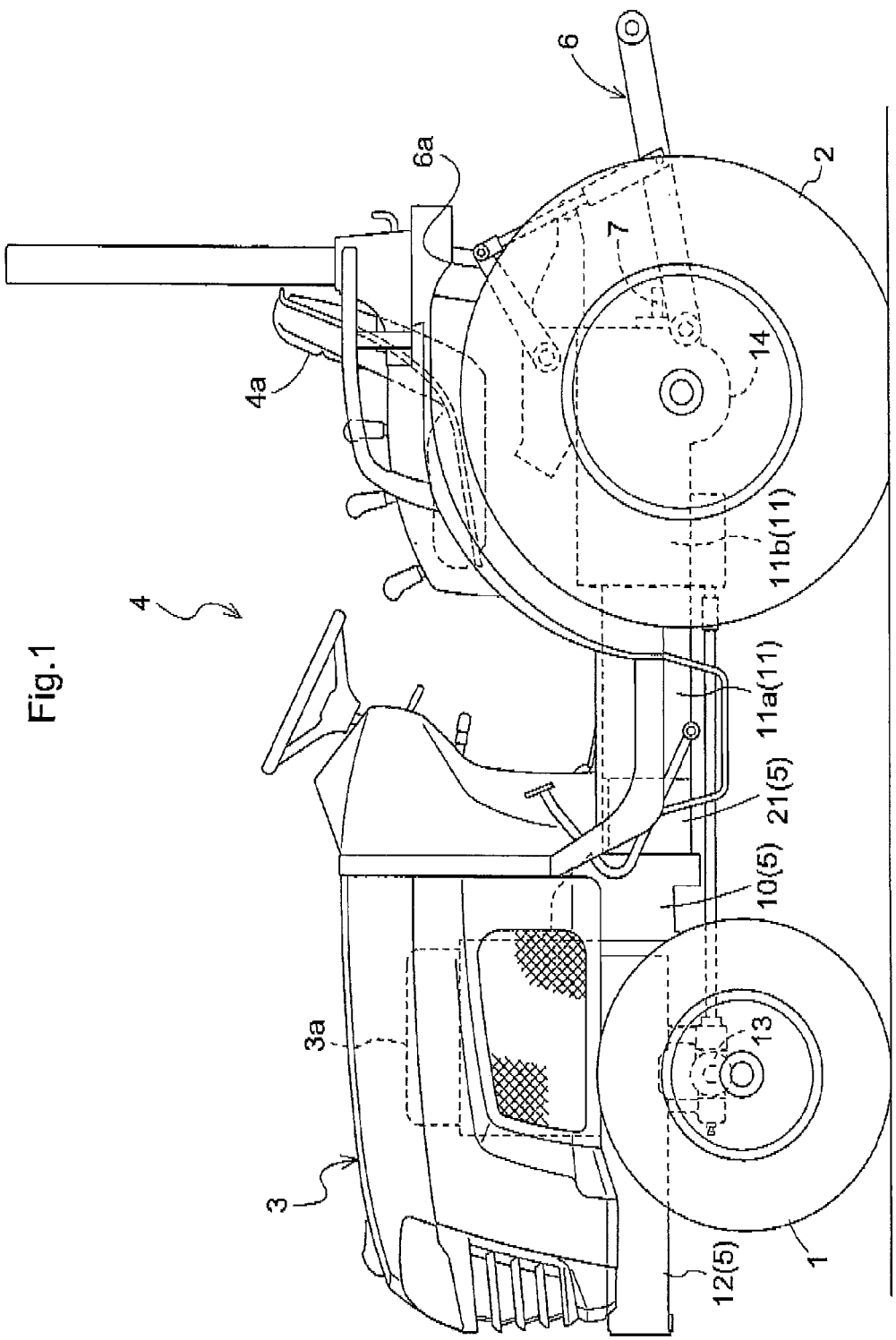
FIG. 1 is a side view showing a tractor in its entirety.
Figure 2:
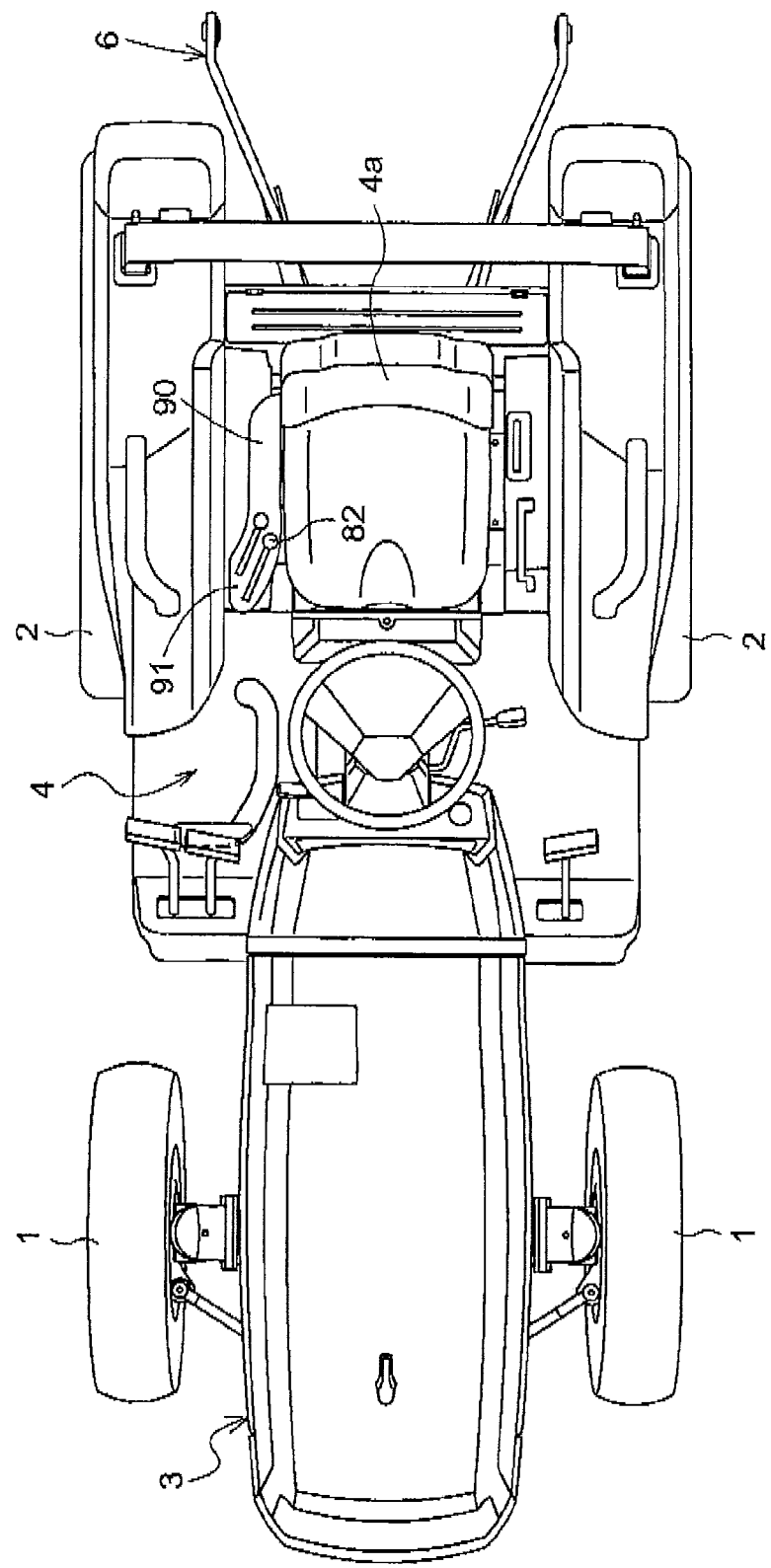
FIG. 2 is a plan view showing the tractor in its entirety.

FIG. 1 is a side view of a tractor as an example of a work vehicle mounting a power train of the present invention. FIG. 2 is a plan view of this tractor. As shown in these figures, the tractor relating to this embodiment of the present invention includes a pair of right and left steerable and drivable front wheels 1, 1, a pair of right and left drivable rear wheels 2, 2, an engine section 3 including an engine 3*a* disposed at a front portion of the vehicle body, and a driver's section 4 having a driver's seat 4*a* disposed at a rear portion of the vehicle body. At the rear end of a vehicle body frame 5 of the tractor, there are disposed a link mechanism 6 and a power takeoff (PTO) shaft 7 projecting rearwardly of the vehicle body from the rear end of the vehicle body frame 5. The link mechanism 6 includes a pair of right and left vertically pivotable lift arms 6*a*, 6*a* distributed to the opposed lateral sides of the vehicle body frame 5.

By transmitting an output from the engine 3*a* via the PTO shaft 7 to a rotary cultivator device connected to the tractor, this tractor can function as a riding type cultivator machine. In this way, this tractor is configured as a multi-purpose work vehicle that can function as various kinds of riding type work vehicles by connecting a various kinds of utility implements to the rear portion of the vehicle body to be lifted up/down and to be driven thereby.

Figure 5:
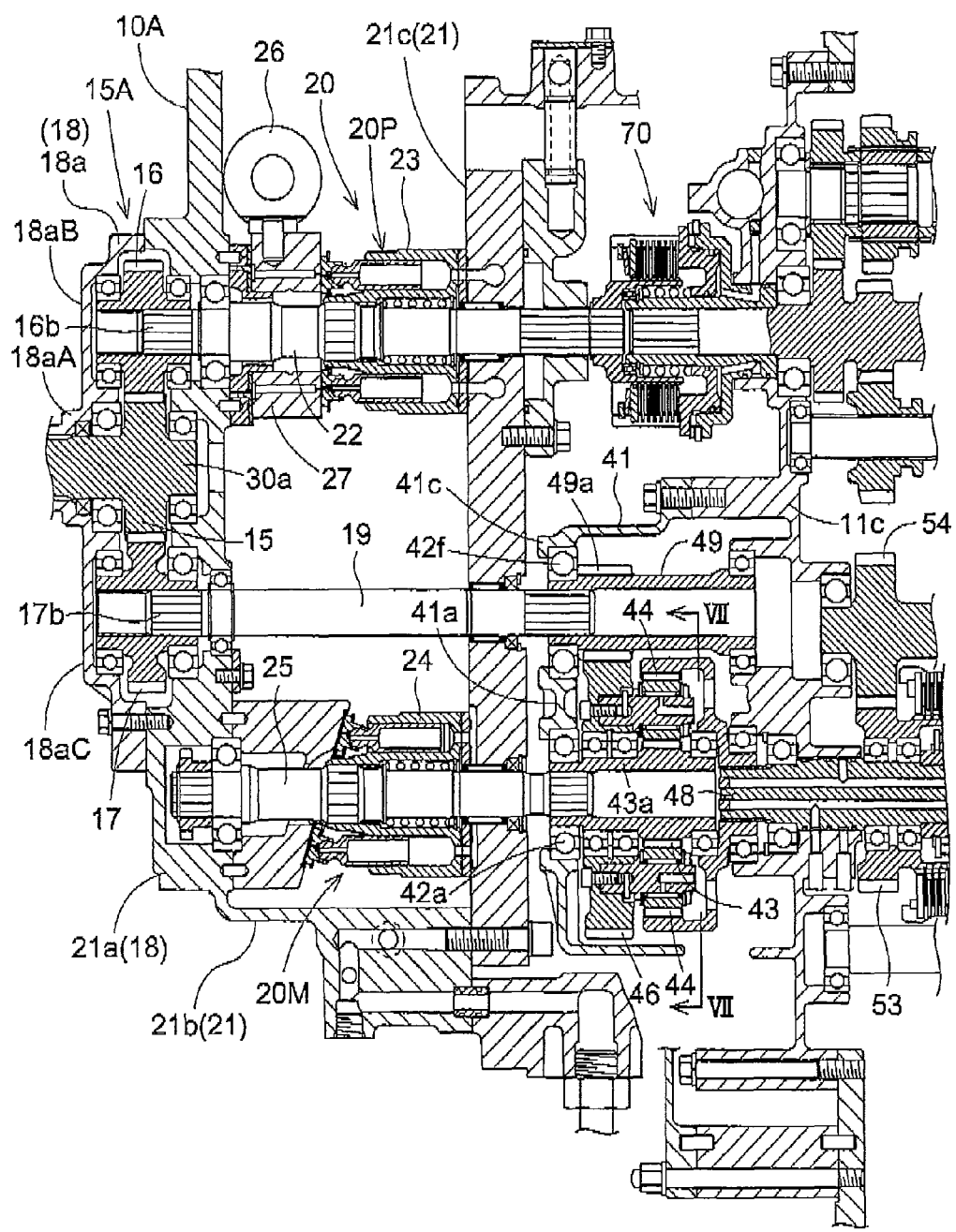
FIG. 5 is a section view showing a branch transmission mechanism, a hydrostatic stepless speed changer unit (HST), and a planetary gear unit under their developed states.

The vehicle body frame 5 mounts the engine 3*a*, a clutch housing 10 connected to the rear portion of the engine 3*a*, a stepless speed changer case 21 having its front portion detachably attached to the rear portion of the clutch housing 10, a transmission case 11 connected to the rear portion of the stepless speed changer case 21 and a front wheel support frame 12 connected to a lower portion of the engine 3*a*. The transmission case 10 includes a front transmission case 11*a* having its front portion detachably attached to a rear portion of the stepless speed changer case 11 and a rear transmission case 11*b* having its front portion detachably attached to a rear portion of the front transmission case 11*a*. The clutch housing 10 and the stepless speed changer case 21 are formed integral and as shown in FIG. 5, a rear wall 10A of the clutch housing 10 and a front wall portion 21*a* of the stepless speed changer case 21 are formed as an integrated wall. Incidentally, the clutch housing 10 and the stepless speed changer case 21 can be provided as separate components, and the font wall portion 21a of the stepless speed changer case 21 can be detachably attached to the rear wall of the clutch housing 10.

Figure 3:
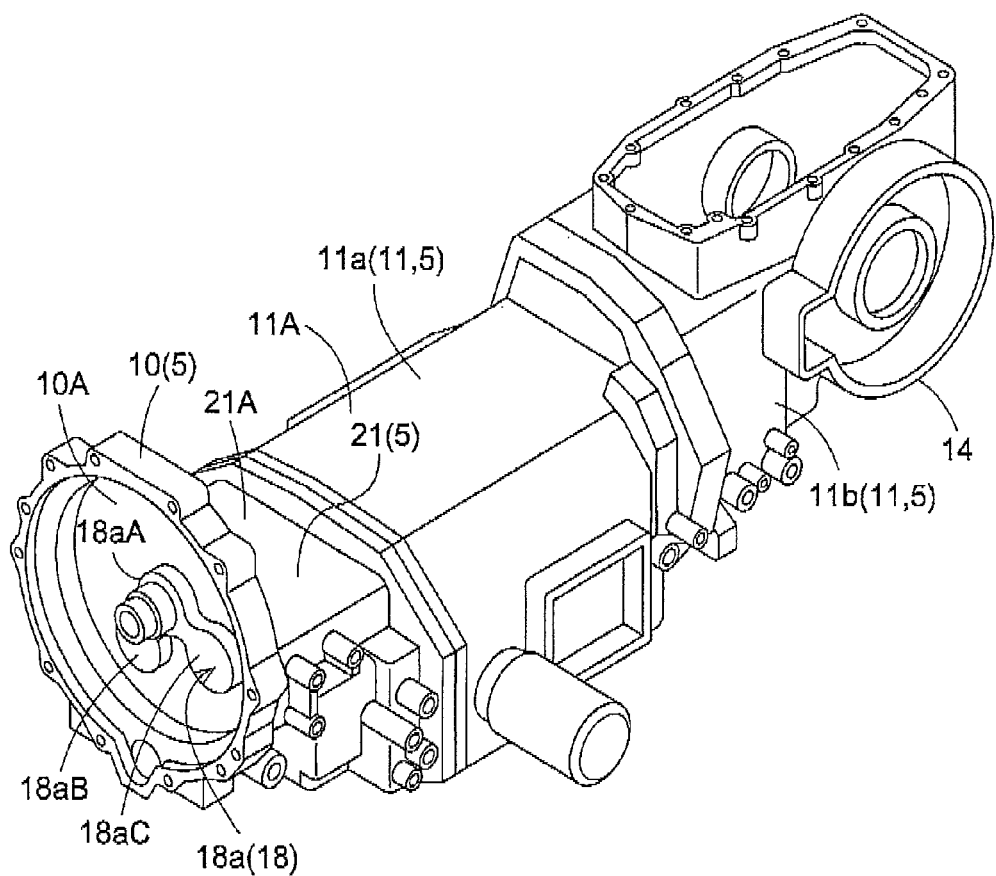
FIG. 3 is a perspective view showing a rear portion of a vehicle body frame.

FIG. 3 is a perspective view showing a rear portion of the vehicle body frame 5. As shown in FIG. 1 and FIG. 3, the vehicle body frame 5 includes a front wheel drive case 13 attached to the front wheel support frame 12 and supports the pair of right and left front wheels 1, 1 via this front wheel drive case 13. The vehicle body frame 5 further includes a pair of right and left rear wheel drive cases 14, 14 disposed in distribution on the opposed lateral sides of the rear transmission case 11b and supports the pair of right and left driving rear wheels 2, 2 via the pair of right and left rear wheel drive cases 14, 14.

Figure 4:
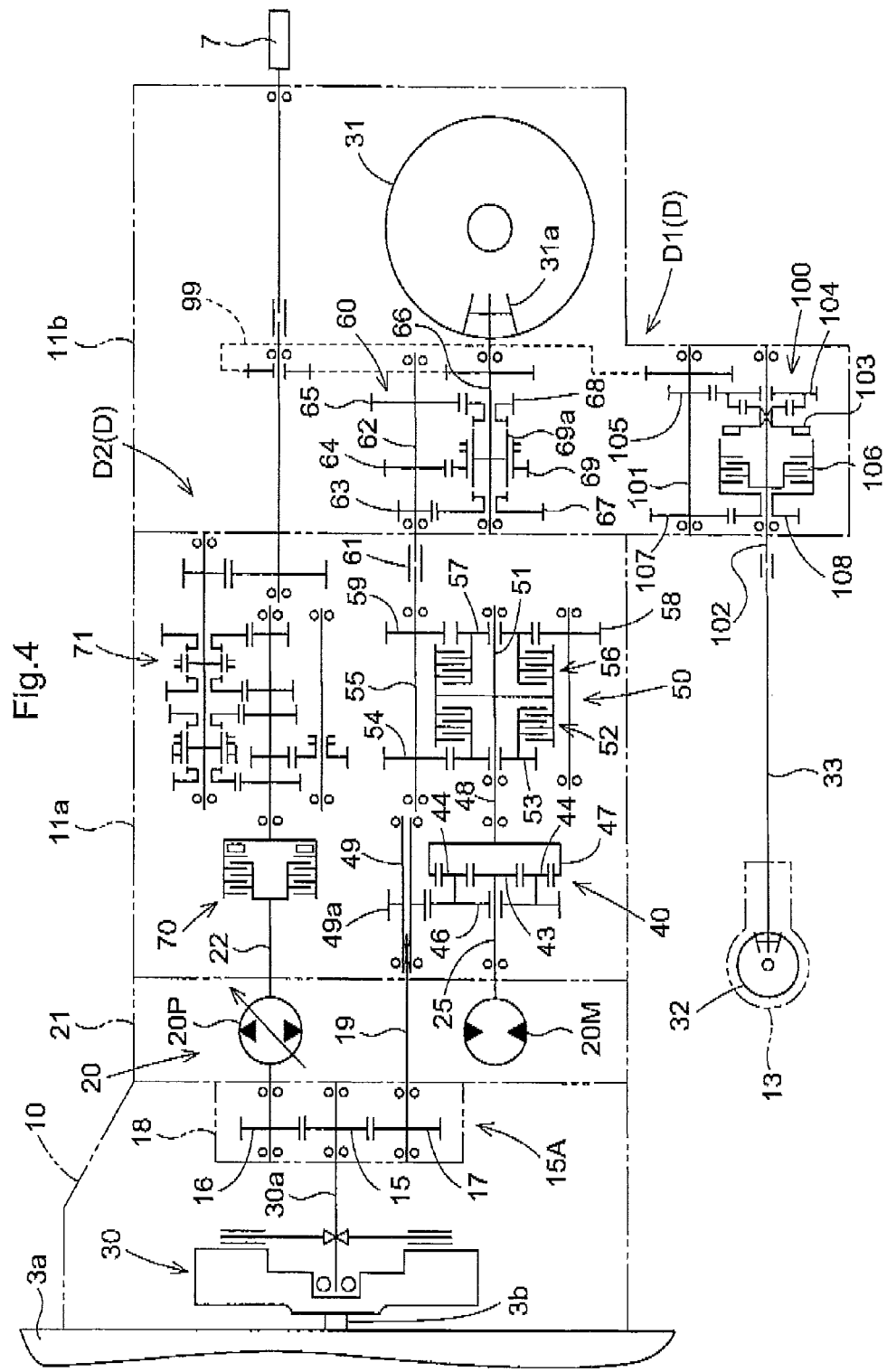
FIG. 4 is a skeleton view showing a power train.

FIG. 4 is a skeleton view showing a power train D mounted on the vehicle body for transmitting engine power to the front wheels 1, the rear wheels 3 and the PTO shaft 7. This skeleton view shows the power train D in its developed condition. As shown in FIG. 4, the power train D is configured to input power outputted from an output shat 3b of the engine 3a to a stepless speed changer unit (HST) 20 and a planetary gear unit 40 as a planetary gearing mechanism 30 and a branch transmission mechanism 15A. The power train D can be divided between a travel transmission line D1 and an implement transmission line D2. In the travel transmission line D1, the power outputted from an output shaft 48 of a planetary gear unit 40 is transmitted via a forward/reverse switchover mechanism 50 to an auxiliary speed changer mechanism 60 and the power from an output shaft 66 of the auxiliary speed changer mechanism 60 is transmitted to a rear wheel differential mechanism 31 and also from the output shaft 66 of the auxiliary speed changer mechanism 60 via a gear transmission mechanism 99, a front wheel transmission mechanism 100 and a rotary shaft 33 to a front wheel differential mechanism 32. In the implement transmission line D2, power from a pump shaft 22 provided in a pump 20P constituting the HST 20 is inputted via an implement clutch 70 to an implement speed changer mechanism 71 and speed-changed in four speeds and the resultant speed-changed power is transmitted to the PTO shaft 7.

The HST 20 is housed in the stepless speed changer case 21 connected to the front portion of the front transmission case 11a. The planetary gear unit 40 and the forward/reverse travel switchover mechanism 50 are housed in the front transmission case 11a. The auxiliary speed changer mechanism 60, the rear wheel differential mechanism 30 and the front wheel transmission mechanism 100 are housed in the rear transmission case 11b. The branch transmission mechanism 15A is housed in a transmission mechanism case 18 provided forwardly of the stepless speed changer case 21.

Next, the travel transmission line D1 will be described in details.

As shown in FIGS. 4 and 5, the branch transmission mechanism 15A includes one engine-side gear 15 and a pair of transmission gears 16, 17 that are rotatably mounted within the transmission mechanism case 18 connected to the front wall portion 21a of the stepless speed changer case 21.

The transmission mechanism case 18 includes a case main constituted of the front wall portion 21a of the stepless speed changer case 21 and a lid case 18a disposed on the inner side of the clutch housing 10 and detachably attached to a front face of a rear wall 10A of this clutch housing 10 from the front side thereof by means of a connecting bolt. As shown in FIG. 3 and FIG. 5, the lid case 18a includes a first lid case portion 18aA covering the engine-side gear 15 from the front side thereof, a second lid case portion 18aB covering the transmission gear 16 from the front side thereof and a third lid case portion 18aC covering the transmission gear 17 from the front side thereof. The first lid case portion 18aA, the second lid case portion 18aB and the third lid case portion 18aC are configured such that the shape of each one of these first lid case portion 18aA, the second lid case portion 18aB and the third lid case portion 18aC as seen from the fore/aft direction of the vehicle body is formed as a circle about a rotational axis 15a of the engine-side gear 15 or a rotational axis 16a of the transmission gear 16 or a rotational axis 17a of the transmission gear 17 and also that the centers of the first lid case portion 18aA, the second lid case portion 18aB and the third lid case portion 18aC form three separate vertices of a triangle and outer peripheral portion of the first lid case portion 18aA, the second lid case portion 18aB and the third lid case portion 18aC are formed continuous with each other. Therefore, the shape of the lid case 18a as a whole as seen from the fore/aft direction of the vehicle body is a shape constituted from three circles continuous and close with each other.

As shown in FIG. 4 and FIG. 5, the engine-side gear 15 is mounted at an end of the output shaft 30a of the main clutch mechanism 30 to be rotatable in unison therewith and is supported to be rotatable with the output shaft 30a acting as a rotational support shaft therefor. When the main clutch mechanism 30 is under an engaged condition, the gear 15 is operably connected to the engine 3a side to be rotatably driven by the drive force outputted by the engine 3a through its output shaft 3b.

Figure 6:
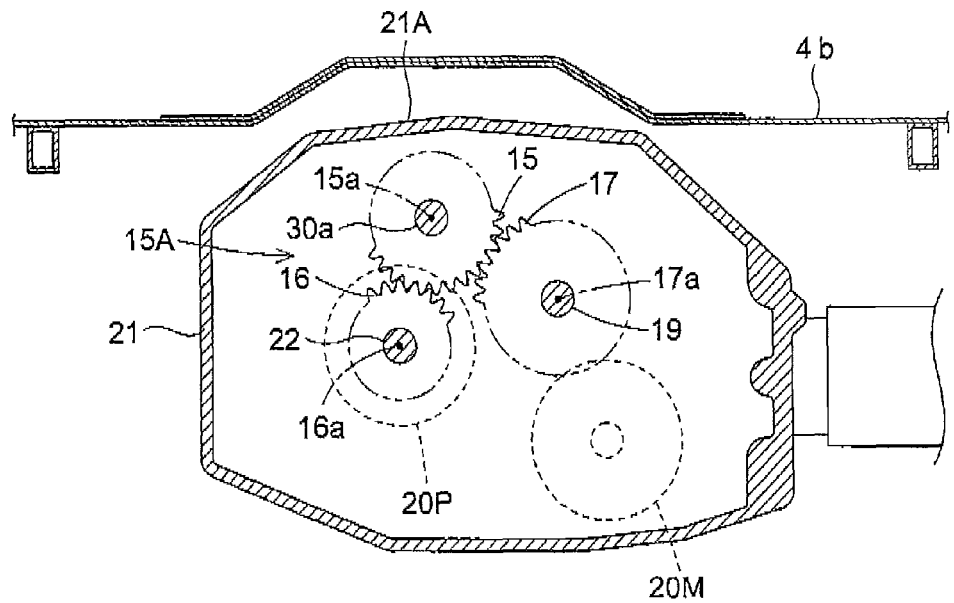
FIG. 6 is a front view in vertical section showing the branch transmission mechanism.

FIG. 6 is a font view in vertical section showing the branch transmission mechanism 15A. As shown in this figure as well as in FIG. 4 and FIG. 5, the pair of transmission gears 16, 17 are configured such that the rotational axes 16a, 17a thereof are located at disposing positions lower than the disposing position of the rotational axis 15a of the engine-side gear 15 and also that the rotational axis 16a of one transmission gear 16 is located at a disposing height lower than the rotational axis 17a of the other transmission gear 17. One transmission gear 16 is connected to a front end of a pump shaft 22 as an input shaft oriented along the fore/aft direction of the vehicle body and included in the pump 20P constituting the HST 20 to be rotatable therewith through a pump side interlocking mechanism 16b utilizing a spline connection. The other transmission gear 17 is connected to an extension end portion of an engine power transmission shaft 19 extending through the stepless speed changer case 21 from the planetary gear unit 40 forwardly of the vehicle body via a planet interlocking mechanism 17b utilizing a spline connection.

Therefore, the branch transmission mechanism 15A is disposed forwardly of the vehicle body relative to the pump 20A and a motor 20M constituting the HST 20 and is configured such that the drive force outputted by the engine 3a through its output shaft 3b is branched to the HST 20 side and the planetary gear unit 40 side, on more forward side of the vehicle body than the HST 20, and the drive force branched to the HST 20 side is inputted via the pump shaft 22 to the HST 20 and the drive force branched to the planetary gear unit 40 side is inputted via the engine power transmission shaft 19 to the planetary gear unit 40. With these, as shown in FIG. 3, upwardly of the HST 20, there is formed a flat portion 21A having a lower disposing height than a flat portion 11A of the upper side of the transmission case 11, thus facilitating disposing of a driver's section access step 4b or the like upwardly.

As shown in FIG. 4 and FIG. 5, the HST 20 includes the stepless speed changer case 21 connected continuously to the front portion of the front transmission case 11a, and the pump 20P and the motor 20M that are disposed inside the stepless speed changer case 21 and on the forward side of the vehicle body relative to the planetary gear unit 40.

As shown in FIG. 5 and FIG. 6, the stepless speed changer case 21 includes a case main 21b detachably connected to the front portion of the front transmission case 11a and a port plate 21c detachably connected to a rear portion of the case math 21b. The pump 20P and the motor 20M are juxtaposed along the transverse direction of the vehicle body as seen in a plan view of the vehicle body, so that these components 20P, 20M have same size in the fore/aft direction of the vehicle body as well as same size in the vertical direction of the vehicle body. The pump 20P is comprised of an axial plunger type hydraulic pump of a variable displacement configuration and the motor 20M is comprised of an axial plunger type hydraulic motor.

Therefore, with the above-described HST 20 in operation, as the drive force from the engine 3a is inputted to the pump shaft 22, a cylinder block 23 of the pump 20P is rotatably driven by the pump shaft 22, so that the pump 20P feeds pressure oil to the motor 20M. Then, a cylinder block 24 of the motor 20M is rotatably driven by the pressure oil from the pump 20P and the force is outputted from the motor shaft 22 to the planetary gear unit 40. Further, in this HST 20, in response to an operation of a cylinder 26 operably coupled to a awash plate 27 of the pump 20P, the angle of the awash plate 27 is varied by the cylinder 26. With this awash angle change, speed is changed to a forward rotation state, a reverse rotation state, or a neutral state between the forward rotation state and the reverse rotation state. Further, when the speed is changed to either the forward rotation state or the reverse rotation state, the rotation speed of the pump 20P is varied in a stepless manner thereby to change the rotational speed of the motor 20M steplessly. As a result, the rotational speed of the drive force outputted from the motor shaft 25 to the planetary gear unit 40 is changed in a stepless manner. Whereas, when the speed is changed to the neutral state, the HST 20 stops driving of the motor 20M by the pump 20P, thus stopping the output from the motor shaft 25 to the planetary gear unit 40.

Figure 8:
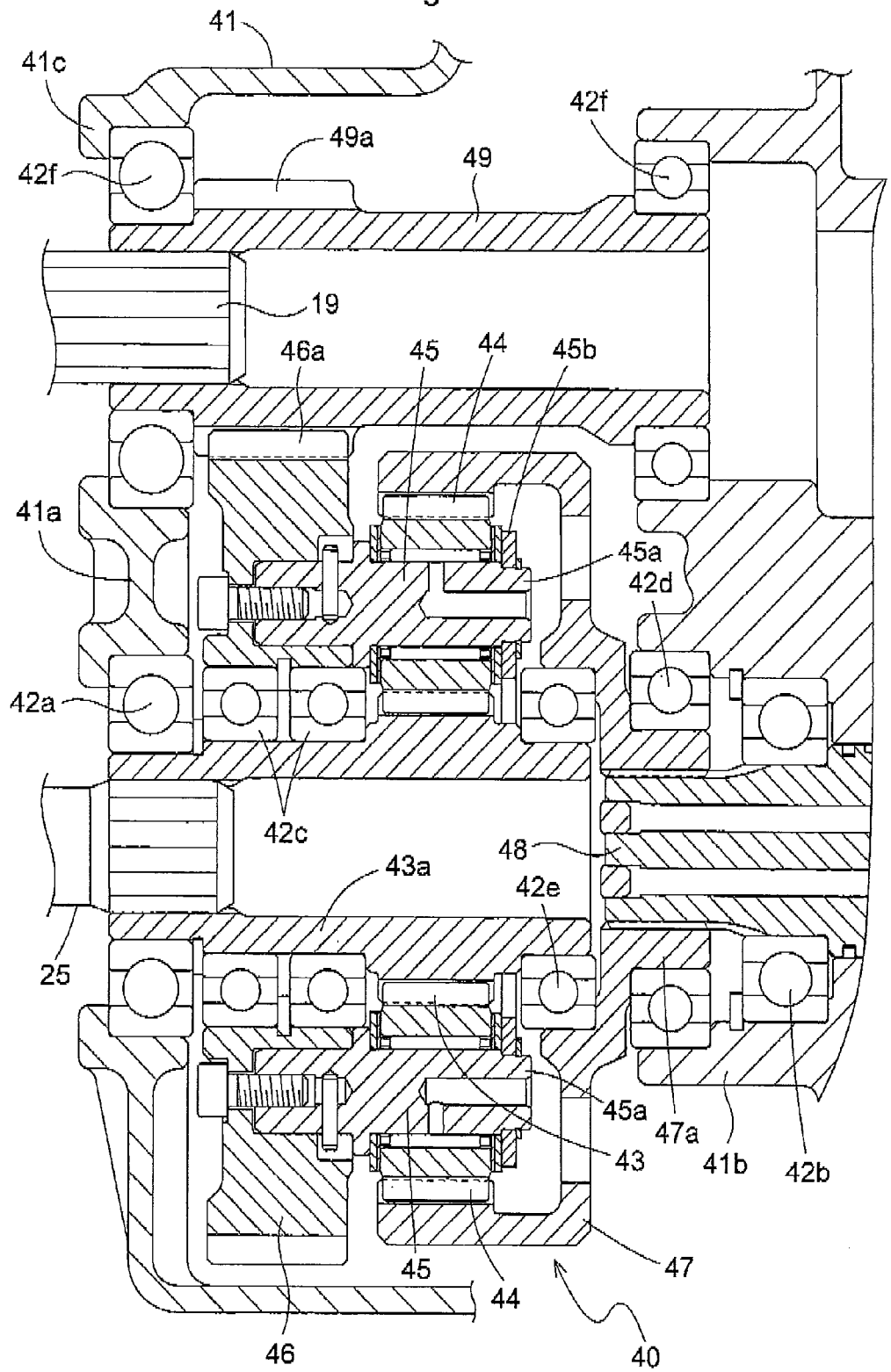
FIG. 8 is a side view in vertical section showing the planetary gear unit.

FIG. 8 is a side view in vertical section showing the planetary gear unit 40. As shown in this figure and also in FIGS. 4 and 5, the planetary gear unit 40 includes a planetary transmission case 41 provided in the front transmission case 11a and connected to its shaft support portion 11c, a sun gear 43 having a boss portion 43a rotatably supported on a support portion 41a of the planetary transmission case 41, three planetary gears 44 disposed around the sun gear 43 and equidistantly spaced apart from each other, a carrier 46 rotatably supporting each planetary gear 44 via a support shaft 45, a ring gear 47 meshing with the three planetary gears 44 and an output shaft 48 rotatably supported to a support portion 41b of the planetary transmission case 41 via a bearing 42b.

Figure 7:
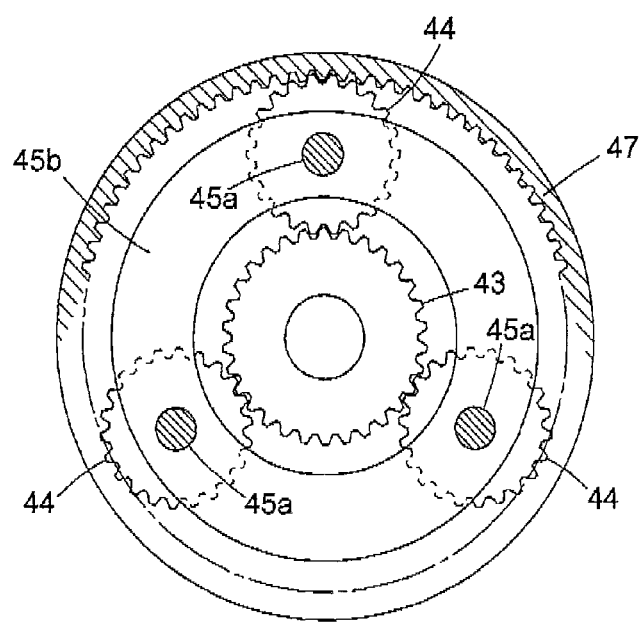
FIG. 7 is a section view taken along a VII-VII line in FIG. 5.

The carrier 46 is rotatably supported to the boss portion 43a of the sun gear 43 via a pair of bearings 42c, 42c. The boss portion 47a of the ring gear 47 is rotatably supported to the support portion 41b of the planetary transmission case 41 via the bearing 42c and rotatably supported to the boss portion 43a of the sun gear 48 via the bearing 42e. The support shaft 45 of each planetary gear 44 connected at its one end only in cantilever manner to the carrier 46 is supported to the carrier 46. For the planetary gears 44 of the three support shafts 45, one annular support plate 46 is connected to the three support shafts 45 for connecting end portions 45a thereof opposite to the ends where the carrier 46 is located. As shown in FIG. 7, the support plate 45b interconnects the end portions 45a of the three support shafts 45 on the opposite side to the carrier that are supported in the cantilever manner to the carrier 46, thereby to prevent inclination of each support shaft 45 relative to the carrier 46. So, inclination of the planetary gears 44 relative to the sun gear 43 and the ring gear 47 is prevented, thereby to maintain the meshed conditions of the planetary gears 44 relative to the sun gear 43 and the ring gear 47 under normal conditions.

The sun gear 43 is operably connected to the motor shaft 25 of the HST 20 to be rotatable therewith through a spline connection provided between the boss portion 43a of the sun gear 43 and the motor shaft 25 of the HST 20.

The engine power transmission shaft 19 extends from an end of a cylindrical input rotary body 49 rotatably supported to the planetary transmission case 41 via a bearing 42f. The engine power transmission shaft 19 and the input rotary body 49 are connected to each other to be rotatable in unison via the spline connection. The input rotary body 49 and the carrier 46 are operably coupled to each other through meshing between a transmission gear 49a rotatably mounted on the outer periphery of the input rotary body 49 and a driven gear 46a mounted on the outer periphery of the carrier 46 to be rotatable in unison therewith.

The ring gear 47 is operably coupled to the output shaft 48 via the spline connection provided between the boss portion 47a of the ring gear 47 and the output shaft 48.

That is, with the planetary transmission unit 40 in operation, the drive force outputted from the engine 3a through its output shaft 3b is inputted to the input rotary body 49 via the engine-side gear 15, the transmission gear 17 and the engine power transmission shaft 19. With this, the drive force from the engine 3a is inputted to the carrier 46, without being affected by the speed changing effect of the HST 20. And, the drive force outputted from the HST 20 from the motor shaft 25 is inputted to the sun gear 43, so that the drive force from the HST 20 and the drive force from the engine 3a not affected by the speed changing effect of the HST 20 are synthesized with each other and the resultant synthesized drive force is inputted from the output shaft 48 to the input shaft 51 of the forward/reverse travel switchover mechanism 50.

Therefore, in the travel transmission line D1, at a position forwardly of the vehicle body relative to the HST 20, the branch transmission mechanism 15A branches the drive force outputted from the engine through its output shaft 3a to the HST 20 side and to the planetary gear unit 40 side. The power branched to the HST 20 side is inputted by the pump shaft 22 to the pump 20P of the HST 20, so that through the conversion functions of the pump 20P and the motor 20M of the HST 20, the power is converted to a drive force in the forward rotation direction and a drive force in the reverse rotation direction. And, whether the power is converted to the drive force in either the forward rotation direction or the reverse rotation direction, the power is speed-changed in stepless manner and then outputted from the motor shaft 25. The drive force outputted by the HST 20 from the motor shaft 25 is inputted to the sun gear 43 of the planetary gear unit 40. The branched power branched to the planetary gear unit 40 side by the branch transmission mechanism 15A is inputted to the carrier 46 of the planetary gear unit 40 through the engine power transmission shaft 19 and the input rotary body 49. In the planetary gear unit 40, the drive force from the engine 3a and the drive force from the HST 20 are synthesized with each other and the resultant synthesized force is outputted from the output shaft 48 to the forward/reverse travel switchover mechanism 50.

As shown in FIG. 4, the forward/reverse travel switchover mechanism 50 includes an input shaft 61 operably coupled to the output shaft 48 of the planetary gear unit 40 to be rotatable therewith, a forward travel transmission section for transmitting the drive force of the input shaft 61 to an output shaft 55 via a forward travel dutch 52, a transmission gear 53 and a forward travel output gear 54, and a reverse travel transmission section for transmitting the drive force of the input shaft 51 to the output shaft 55 via a reverse travel clutch 56, a transmission gear 57, a reverse rotation gear 58 and a reverse travel output gear 59.

Therefore, with the forward/reverse travel switchover mechanism 50 described above in operation, the mechanism 50 is rendered into a forward travel state when the forward travel clutch 52 is operated into the engaged state and the reverse travel clutch 56 is operated into the disengaged state. With this, the drive force transmitted to the input shaft 51 from the output shaft 48 of the planetary gear unit 40 is converted through the forward travel transmission section into a forward travel drive force and this force is outputted from the output shaft 55 to the input shaft 62 of the auxiliary speed changer mechanism 60. Whereas, when the forward travel clutch 52 is operated into the disengaged state and the reverse travel clutch 56 is operated into the engaged state, the forward/reverse travel switchover mechanism 50 is rendered into a reverse travel state. With this, the drive force transmitted to the input shaft 51 from the output shaft 48 of the planetary gear unit 40 is converted through the reverse travel transmission section into a reverse travel drive force and this force is outputted from the output shaft 55 to the input shaft 62 of the auxiliary speed changer mechanism 60.

As shown in FIG. 4, the auxiliary speed changer mechanism 60 includes an input shaft 62 coupled to the output shaft 55 of the forward/reverse travel switchover mechanism 50 via a joint 61 to be rotatable therewith, a first gear 63, a second gear 64 and a third gear 65 which are mounted on this input shaft 62 to be rotatable therewith, a low speed gear 67 rotatably mounted on the output shaft 66 and meshed with the first gear 63, a high speed gear 68 rotatably mounted on the output shaft 66 and meshed with the third gear 65, a transmission tubular shaft 69a rotatably mounted to the output shaft 65 to be rotatable therewith, and a shift gear 69 mounted on the transmission tubular shaft 69a to be rotatable therewith and shiftable relative thereto.

With the auxiliary speed changer mechanism 60 in operation, when the shift gear 69 is shifted along the transmission tubular shaft 69a and a boss portion of this shift gear 69 comes into engagement with the boss portion of the low speed gear 67 over the transmission tubular shaft 69a, the drive force transmitted from the forward/reverse travel switchover mechanism 50 to the input shaft 62 is transmitted to the output shaft 66 via the first gear 63, the low speed gear 67, the shift gear 69 and the transmission tubular shaft 69a, thus providing a low speed state.

Further, with the auxiliary speed changer mechanism 60 in operation, when the shift gear 69 is shifted and its teeth portion formed on the outer periphery of this shift gear 69 meshes with the second gear 64, the drive force transmitted from the forward/reverse travel switchover mechanism 50 to the input shaft 62 is transmitted to the output shaft 66 via the second gear 64, the shift gear 69, and the transmission tubular shaft 69a, thus providing an middle speed state.

Further, with the auxiliary speed changer mechanism 60 in operation, when the shift gear 69 is shifted along the transmission tubular shaft 69a and the boss portion of the shift gear 69 comes into engagement with the boss portion of the high speed gear 68 over the transmission tubular shaft 69a, the drive force transmitted from the forward/reverse travel switchover mechanism 50 to the input shaft 62 is transmitted to the output shaft 66 via the third gear 65, the high speed gear 68, the shift gear 69, and the transmission tubular shaft 69a, thus providing a high speed state.

As shown in FIG. 4, the front wheel transmission mechanism 100 includes an input shaft 101 operably coupled to the output shaft 62 of the auxiliary speed changer mechanism 60 via a gear interlocking mechanism 99, an output shaft 102 operably connected to the rotary shaft 33 and a switching body 103 mounted on the output shaft 102 to be rotatable therewith and shiftable relative thereto.

With the above-described front wheel transmission mechanism 100 in operation, when the switching body 103 is shifted rearward to establish engagement between this switching body 103 and the transmission gear 104, the drive force transmitted from the auxiliary speed changer mechanism 60 to the input shaft 101 via the gear interlocking mechanism 99 is transmitted to the output shaft 102 via the transmission gear 105, the transmission gear 104 and the switching body 103, thus providing an equal speed transmission state wherein the power is transmitted from the output shaft 102 to the front wheel differential mechanism 32 so as to drive the front wheels 1 and the rear wheels 2 at a same peripheral speed.

Further, with the front wheel transmission mechanism 100 in operation, when the switching body 103 is shifted and an acceleration transmission clutch 106 is switched into the engaged state by the switching body 103, the drive force transmitted from the auxiliary transmission mechanism 60 via the gear interlocking mechanism 99 to the input shaft 101 is transmitted to the output shaft 102 via the transmission gear 107, the transmission gear 108 and the acceleration transmission clutch 106, thus providing an acceleration transmission state wherein the power is transmitted from the output shaft 102 to the front wheel differential mechanism 32 so as to drive the front wheels 1 at a higher peripheral speed than the rear wheels 2.

Therefore, in the travel transmission line D1, the output from the output shaft 48 of the planetary gear unit 40 is switched over between a forward travel drive force and a reverse travel drive force by the forward/reverse travel switchover mechanism 50 and the forward travel drive force or the reverse travel drive force outputted from the forward/reverse travel switchover mechanism 50 is speed-changed into three speeds of a low speed, a middle speed and a high speed; and the forward travel drive force or the reverse travel drive force speed-changed by the auxiliary speed changer mechanism 60 is transmitted from the output shaft 66 of the auxiliary speed changer mechanism 60 to the rear wheel differential mechanism 31 and further from the output shaft 66 of the auxiliary speed changer mechanism 60 via the gear transmission mechanism 99, the front wheel transmission mechanism 101 and the rotary shaft 33 to the front wheel differential mechanism 32.

Figure 9:
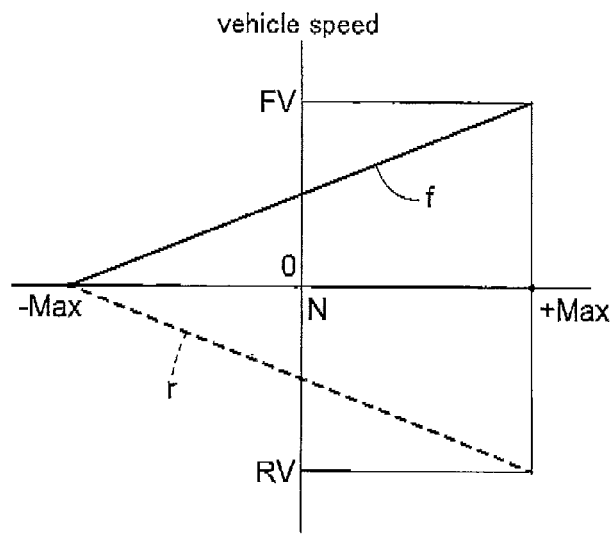
FIG. 9 is an explanatory view illustrating relationship between speed change conditions and vehicle speeds of the HST.

FIG. 9 is an explanatory view illustrating relationship between speed change states of the HST 20 and the traveling speeds (vehicle speeds) of the vehicle body when the engine 3a is set for its acceleration to output drive force of predetermined speeds. The horizontal axis in FIG. 9 represents the speed change states of the HST 20, a mark "N" denotes the neutral position of the HST 20, a mark "−Max" denotes the highest speed position under the reverse rotation state of the HST 20, and a mark "+Max" denotes the highest speed position under the forward rotation state of the HST 20. The vertical axis in FIG. 9 represents the vehicle speeds. The broken line (r) in FIG. 9 represents variation in the vehicle speed when the forward/reverse travel switchover mechanism 50 is operated into the reverse travel state.

As shown in FIG. 9, when the HST 20 is speed-changed to the highest speed position "−Max" under the reverse rotation state, the vehicle speed becomes "0" (zero).

As indicated by the solid line (f) in FIG. 9, when the forward/reverse travel switchover mechanism 50 is switched to the forward travel state, the vehicle body travels forwardly. And, as the HST 20 is speed controlled from the highest speed position "−Max" under the reverse rotation state to the highest speed position "+Max" under the forward rotation state, the vehicle speed is increased in stepless manner. As the HST 20 is speed controlled to the highest speed position "+Max" under the forward rotation state, the vehicle speed becomes the highest speed "FV".

As indicated by the broken line (r) in FIG. 9, when the forward/reverse travel switchover mechanism 50 is switched to the reverse travel state, the vehicle travels in reverse. As the HST 20 is speed changed from the highest speed position "−Max" under the reverse rotation state to the highest speed position "+Max" under the forward rotation state, the vehicle speed is progressively increased in a stepless manner. As the HST 20 is speed changed to the highest speed position "+Max" under the forward rotation state, the vehicle speed becomes the highest speed "FV".

Incidentally, FIG. 9 shows change in, the vehicle speed on the forward travel side and the reverse travel side in association with speed change control of the HST 20 when the auxiliary speed changer mechanism 60 is speed-changed to the middle speed state. In case the auxiliary speed changer mechanism 60 is speed-changed to the low speed state, vehicle speed changes on the forward travel side and the reverse travel side in association with speed change control of the HST 20 occur with a slope angle smaller than the slope angle indicated by the solid line (f) and the broken line (r) shown in FIG. 9; and the vehicle speed when the HST 20 is operated to the highest speed position "+Max" under the forward rotation state becomes a lower speed than the vehicle speeds "FV", "RV" indicated by the solid line (f) and the broken line (r) shown in FIG. 9. In case the auxiliary speed changer mechanism 60 is speed-changed to the high speed state, vehicle speed changes on the forward travel side and the reverse travel side in association with speed change control of the HST 20 occur with a slope angle greater than the slope angle indicated by the solid line (f) and the broken line (r) shown in FIG. 9; and the vehicle speed when the HST 20 is operated to the highest speed position "+Max" under the forward rotation state becomes a higher speed than the vehicle speeds "FV", "RV" indicated by the solid line (f) and the broken line (r) shown in FIG. 9.

Figure 10:
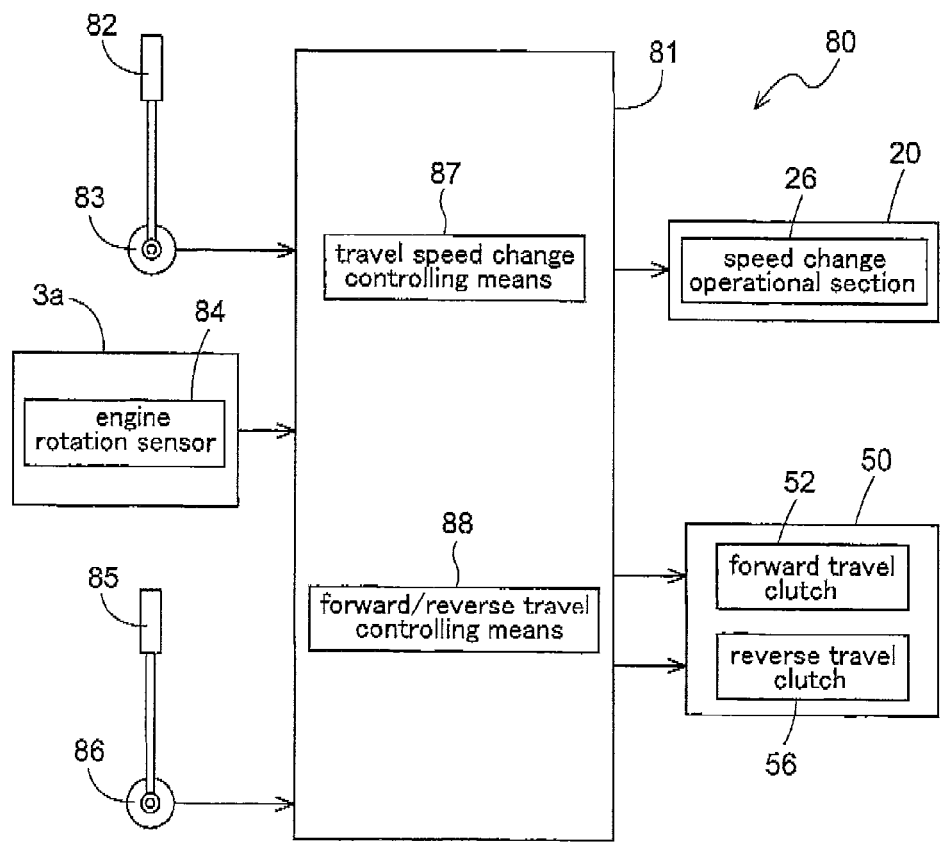
FIG. 10 is a block diagram showing a speed change operational device.

FIG. 10 is a block diagram showing a speed change operational device 80 for speed-changing the travel transmission line D1. As shown in this figure, the speed change operational device 80 for speed-changing the travel transmission line D1 includes a cylinder 26 as an speed change operational section of the HST 20, a control device 81 operably coupled to the forward travel clutch 52 and the reverse travel clutch 56 of the forward/reverse travel switchover mechanism 50, a speed changer lever 82, a speed change detecting sensor 83 for detecting an operational position of the speed changer lever 82, an engine rotation sensor 84 for detecting an output speed of the engine 3a, a forward/reverse travel lever 85, and a forward/reverse travel detecting sensor 86 for detecting an operational position of the forward/reverse travel lever 85.

As shown in FIG. 2, the speed changer lever 82 is provided at a lever supporting portion 91 provided continuously from an armrest 90 disposed on a lateral side of the driver's seat 4a, with the lever 82 being pivotable back and forth.

The speed change detecting sensor 83 is comprised of a rotary type potentiometer having its rotary operational portion operably coupled to the speed changer lever 82. The forward/reverse travel detecting sensor 86 is comprised of a rotary type potentiometer having its rotary operational portion operably coupled to the forward/reverse travel lever 85. The control device 81 is constituted by using a microcomputer and includes a travel speed change controlling means 87 and a forward/reverse travel controlling means 88.

The travel speed change controlling means 87 detects an output speed of the accelerator-set engine 8a based on detection information of the engine rotation sensor 84, judges the operational position of the speed changer lever 82 to which the lever has been operated, based on detection information of the speed change detecting sensor 83, and controls speed changing of the HST 20 via the speed change operational portion 26 so as to realize a vehicle speed such as that shown in FIG. 9, based on the detected output speed of the engine 3a and the detected operational position of the speed changer lever 82.

The forward/reverse travel controlling means 88 judges the operational position of the forward/reverse travel lever 85 to which the lever has been operated, based on detection information of the forward/reverse travel switchover sensor 86, and controls switching-over of the forward travel clutch 52 and the reverse travel clutch 56, based on the result of this judgment, so that the forward/reverse switchover mechanism 50 may be brought into an operational state corresponding to the operational position of the forward/reverse travel lever 85.

Second Embodiment

Figure 11:
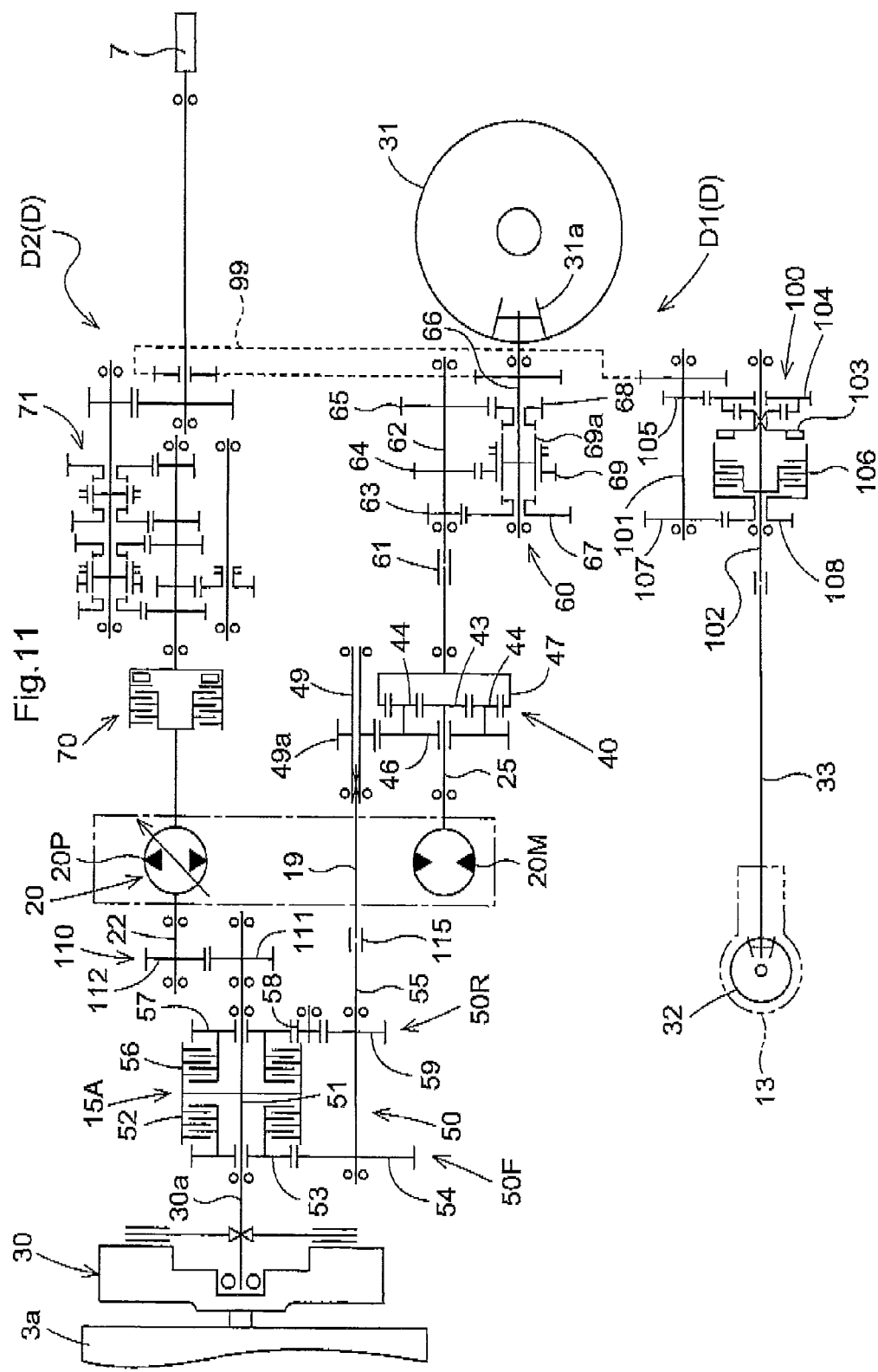
FIG. 11 is a skeleton view showing a power train according to a second embodiment.

FIG. 11 is a skeleton view showing a power train D according to a second embodiment of the present invention. As shown in this figure, the power train D according to the second embodiment is identical to the power train D1 according to the first embodiment, in the respect of the work transmission line D2, but, differs from the power train D of the first embodiment, in the respect of the travel transmission line D1.

In the travel transmission line D1 according to the second embodiment, the forward/reverse switchover mechanism 50 is disposed transmission-wise upstream of the HST 20 and the branch transmission mechanism 15A is constituted by utilizing this forward/reverse switchover mechanism 50. That is, the input shaft 51 of the forward/reverse travel switchover mechanism 50 is operably coupled to the output shaft 30a of the main clutch mechanism 30 so as to be operably coupled to the output shaft 3b of the engine 3a via the main clutch mechanism 20. The input shaft 51 of the forward/reverse switchover mechanism 50 and the pump shaft 22 as an input shaft of the HST 20 are operably coupled to each other via the pump interlocking mechanism 110; and the output shaft 55 of the forward/reverse travel switchover mechanism 50 and the engine power transmission shaft 19 provided in the planetary gear unit 40 are operably coupled to each other via the planetary transmission means 115, thereby to constitute the branch transmission mechanism 15A.

The pump interlocking mechanism 110 includes an input shaft gear 111 mounted to the input shaft 51 to be rotatable therewith and a pump shaft gear 112 mounted on the pump shaft 22 to be rotatable therewith and meshed with the input shaft gear 111. Instead of being constituted from the gears 111, 112, the pump interlocking mechanism 110 can be constituted from a joint interconnecting the input shaft 51 and the pump shaft 22 or from an arrangement of the input shaft 51 and the pump shaft 22 being connected by being formed integral with each other.

The planetary transmission means 115 is constituted from a joint interconnecting the output shaft 55 and the engine power transmission shaft 19 to be rotatably in unison. Alternatively, this planetary transmission means 115 can comprise, other than such joint, an interconnection arrangement of the output shaft 55 and the engine power transmission shaft 19 by integral formation thereof or operative coupling arrangement of the output shaft 55 and the engine power transmission shaft 19 via a coupling gear.

The forward/reverse travel switchover mechanism 50 includes a forward travel transmission section 50F configured to transmit the drive force of the input shaft 51 to the output shaft 55 via the forward travel clutch 52, the transmission gear 53 and the forward travel transmission gear 54 when the forward travel clutch 52 is operated into the engaged state and a reverse travel transmission section 50R configured to transmit the drive force of the input shaft 51 to the output shaft 55 via the reverse travel clutch 56, the transmission gear 57 and the reverse travel transmission gear 59 when the reverse travel clutch 56 is operated into the engaged state Therefore, the branch transmission mechanism 15A branches the drive force outputted by the engine 3a through its output shaft 3b to the side of HST 20 and to the side of the planetary gear unit 40, by the input shaft 51, the pump interlocking mechanism 110, the forward travel transmission section 50F, the reverse travel transmission section 50R and the output shaft 55, so that the drive force branched to the HST 20 side is inputted via the pump shaft 22 to the pump 20P of the HST 20 and the drive force branched to the planetary gear unit 40 side is inputted to the planetary gear unit 40 via the engine power transmission shaft 19.

Figures 12, 13:
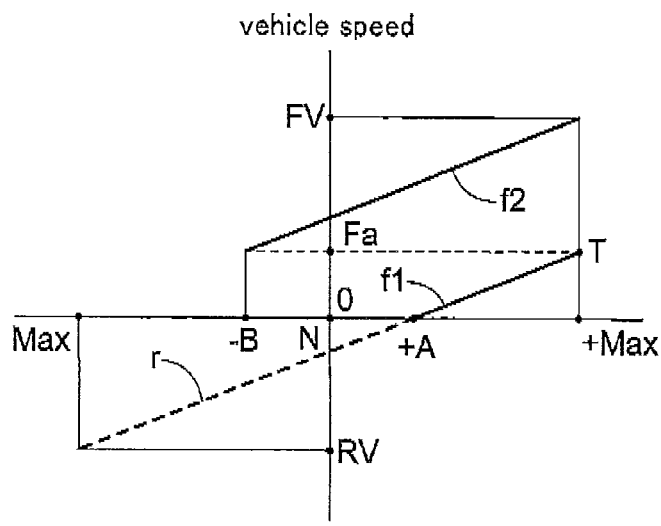
FIG. 12 is an explanatory view illustrating relationship between speed change conditions and vehicle speeds of the HST in the power train according to the second embodiment.
FIG. 13 is an explanatory view illustrating relationship among travel directions, speed ranges and speed change conditions of a forward/reverse travel switchover mechanism.

FIG. 12 is an explanatory view of the travel transmission line D1 according to the second embodiment, i.e. an explanatory view illustrating relationship between speed change states of the HST 20 and the traveling speeds (vehicle speeds) of the vehicle body when the engine 3a is set for its acceleration to output drive force of predetermined speeds. The horizontal axis in FIG. 12 represents the speed change states of the HST 20, a mark "N" denotes the neutral position of the HST 20, a mark "−Max" denotes the highest speed position under the reverse rotation state of the HST 20, and a mark "+Max" denotes the highest speed position under the forward rotation state of the HST 20. The vertical axis in FIG. 12 represents the vehicle speeds. The vehicle speed change represented by the solid line (f1) in FIG. 12 shows vehicle speed change in a low speed range at the time of forward travel. The vehicle speed change represented by the solid line (f2) in FIG. 12 shows vehicle speed change in a high speed range at the time of forward travel. The vehicle speed change represented by the broken line (r) in FIG. 12 shows vehicle speed change in an entire speed range at the time of reverse travel. FIG. 13 is an explanatory view illustrating relationship among travel direction, vehicle speed range and speed change conditions of the forward/reverse travel switchover mechanism 50.

As shown in FIG. 12 and FIG. 13, when the forward/reverse travel switchover mechanism 50 is switched to the reverse travel state and the HST 20 is speed-changed to a speed position "+A" between the neutral position "N" and the highest speed position "+Max" under the forward rotation state, the vehicle speed becomes "0" (zero).

While the forward/reverse travel switchover mechanism 50 is kept under the reverse travel state, if the HST 20 is speed-changed in the speed change range from the speed position "+A" lower than the highest speed position "+Max" under the forward rotation state to the highest speed position "+Max", the vehicle body travels forward. While the forward/reverse travel switchover mechanism 50 is kept under the reverse travel state, as the HST 20 is speed-changed from the speed position "+A" toward the highest speed position "+Max" under the forward rotation state, the vehicle speed is progressively increased in a stepless manner, so that the HST 20 is speed-changed to the highest speed position "+Max" under the forward rotation state, whereby the vehicle speed becomes "Fa" and a switchover point "T" of the speed change control is reached.

Upon reaching the switchover point "T" of the speed change control, the forward/reverse switchover mechanism 50 is switched over to the forward travel state and also the HST 20 is speed-changed to a speed position "−B" lower than the highest speed position "−Max" under the reverse rotation state. While the forward/reverse travel switchover mechanism 50 is kept under the forward travel state, if the HST 20 is speed-changed in the speed change range from the speed position "−B" to the highest speed position "+Max" under the forward rotation state, the vehicle body travels forwardly. While the forward/reverse travel switchover mechanism 50 is kept to the forward ravel state, as the HST 20 is operated from the speed position "−B" under the reverse rotation state toward the highest speed position "+Max" under the forward rotation state, the vehicle speed is progressively increased in a stepless manner, so that the HST 20 is speed-changed to the highest speed position "+Max" under the forward rotation state, whereby the vehicle speed becomes "FV". Incidentally, the slope of the solid line (f1) representing vehicle speed variation in the low speed range and the slope of the solid line (f2) representing vehicle speed variation in the high speed range become equal to each other. Further, the vehicle speed change from the low speed range (f1) to the high speed range (f2) at the switch change control switching point "T" occurs in a continuous manner.

While the forward/reverse travel switchover mechanism 50 is kept under the reverse travel state, if the HST 20 is speed-changed in the speed change range from the speed position "+A" under the forward rotation state to the highest speed position "−Max" under the reverse rotation state, the vehicle body travels in reverse. While the forward/reverse travel switchover mechanism 50 is kept under the reverse travel state, as the HST 20 is speed-changed from the speed position "+A" under the forward rotation state toward the highest speed position "−Max" under the reverse rotation state, the vehicle speed is progressively increased in a stepless manner and when the HST 20 is speed-changed to the highest speed position "−Max" under the reverse rotation state, the vehicle speed becomes the highest speed "RV". Incidentally, the highest speed "FV" on the forward travel side is higher than the highest speed "RV" on the reverse travel side.

With the travel transmission line D1 according to the second embodiment, the forward/reverse travel switchover mechanism 50 is disposed upstream in the transmission direction relative to the stepless speed changer mechanism 20 and the drive force from the engine 3a is converted into a forward drive force or a reverse drive force through the forward/reverse travel switchover mechanism 50 and inputted to the planetary gear unit 40. Therefore, with this travel transmission line D1 according to the second embodiment, when the vehicle body is caused to travel forwardly in the low speed range (f1), the forward/reverse travel switchover mechanism 50 is switched to the reverse travel state, so that the drive force from the engine 3a not subjected to the speed changing effect by the HST 20 is converted into a reverse drive force and inputted to the planetary gear unit 40. Hence, even when the HST 20 is speed-changed to the forward rotation state and the drive force in the forward rotation direction is inputted from the HST 20 to the planetary gear unit 40, as the planetary gear unit 40 synthesizes the drive force in the forward rotation direction of the HST 20 and the drive force in the reverse rotation direction from the forward/reverse travel switchover mechanism 50 and then outputs a forward chive force at a predetermined low speed. Therefore, by causing the planetary gear unit 40 to perform a speed change function with good transmission efficiency, the vehicle body can be caused to travel forwardly in the low speed range (f1).

With the travel transmission line D1 according to the second embodiment, if the forward/reverse travel switchover mechanism 50 is connected during rotation of the motor 20M of the HST 20, the two drive forces are synthesized with each other through the planetary gear unit 40 and travel by the resultant synthesized drive force is made possible. A switchover operation under this driving condition is possible even if the order is reversed. Also, it is possible to maintain torque even when the vehicle speed is "0" (zero). So, vehicle can be parked e.g. on an inclined surface in a safe and reliable manner.

INDUSTRIAL APPLICABILITY

The present invention is applicable to a power train for various kinds of work vehicles such as a tractor having an implement connected to a rear portion of the vehicle body, a tractor having an implement such as a grass mower connected between front and rear wheels of the vehicle body or connected to a front portion of the vehicle body.

The invention claimed is:

1. A power train for a tractor, the tractor comprising a vehicle body having a forward end and a rear end, comprising:
   an engine positioned at the forward end of the vehicle body;
   an engine power transmission shaft extending along a longitudinal direction of the vehicle body rearwardly of the engine;
   a hydrostatic stepless speed changer unit (HST) configured to receive input power from the engine, said HST having a pump and a motor that are juxtaposed along a transverse direction of the vehicle body as seen in a plan view of the vehicle body;
   a planetary gear unit disposed rearwardly of said HST in the longitudinal direction of the vehicle body and configured to input power from the engine via said engine power transmission shaft and power from said HST and to output a traveling power; and
   a branch transmission mechanism disposed forwardly of said HST in the longitudinal direction of the vehicle body and configured to distribute the power from the engine to an input shaft of said pump and to said engine power transmission shaft,
   wherein the branch transmission mechanism is disposed within a clutch housing connected to a rear portion of the engine, the HST is disposed within a stepless speed changer case having its front portion connected to a rear portion of the clutch housing, and the planetary gear unit is disposed within a transmission case connected to a rear portion of the stepless speed changer case.

2. The power train according to claim 1, wherein said branch transmission mechanism comprises a gear unit having an engine side gear operably coupled to an output shaft of the engine and a transmission gear set meshing with the engine side gear, a rotational axis of said transmission gear set being located lower than a disposing height of a rotational axis of said engine side gear;
   one transmission gear of said transmission gear set is operably coupled to the input shaft of said pump to be rotatable in unison therewith; and
   the other transmission gear of said transmission gear set is rotatable in unison with said engine power transmission shaft.

3. The power train according to claim 1, wherein for transmitting the drive force of said engine power transmission shaft to a carrier of said planetary gear unit, there are provided a transmission gear rotatable in unison with said engine power transmission shaft and a driven gear meshed with said transmission gear and fixed to an outer periphery of said carrier.

4. The power train according to claim 3, wherein said transmission gear is engaged on an outer peripheral face of a rotary body connected coaxially with said engine power transmission shaft.

5. The power train according to claim 1, wherein said branch transmission mechanism includes:
   a forward/reverse travel switchover mechanism having an input shaft operably coupled to an output shaft of the engine;
   a pump interlocking mechanism for interlocking said input shaft of the forward/reverse travel switchover mechanism with said input shaft of the pump; and
   a planet interlocking mechanism for interlocking an output shaft of said forward/reverse travel switchover mechanism with said engine power transmission shaft.

6. A power train for a tractor, the tractor comprising a vehicle body having a forward end and a rear end, comprising:
   an engine positioned at the forward end of the vehicle body;
   an engine power transmission shaft extending along a longitudinal direction of the vehicle body rearwardly of the engine;
   a hydrostatic stepless speed changer unit (HST) configured to receive input power from the engine, said HST having a pump and a motor that are juxtaposed along a transverse direction of the vehicle body as seen in a plan view of the vehicle body;
   a planetary gear unit disposed rearwardly of said HST in the longitudinal direction of the vehicle body and configured to input power from the engine via said engine power transmission shaft and power from said HST and to output a traveling power;
   a branch transmission mechanism disposed forwardly of said HST in the longitudinal direction of the vehicle body and configured to distribute the power from the engine to an input shaft of said pump and to said engine power transmission shaft, the branch transmission mechanism including an engine side gear operably coupled to an output shaft of the engine, and a pair of transmission gears meshing with the engine side gear, wherein a rotational axis of each of said transmission gears extends at a lower level from a ground surface than a rotational axis of said engine side gear;
   a pump side interlocking mechanism connecting one of said transmission gears to the input shaft of said pump to be rotatable in unison with each other; and
   a planet interlocking mechanism connecting the other of said transmission gears to said engine power transmission shaft to be rotatable in unison with each other.

* * * * *